(12) United States Patent
Tsia et al.

(10) Patent No.: US 10,211,587 B2
(45) Date of Patent: Feb. 19, 2019

(54) SPATIAL CHIRPED CAVITY FOR TEMPORALLY STRETCHING/COMPRESSING OPTICAL PULSES

(71) Applicant: Versitech Limited, Hong Kong (CN)

(72) Inventors: Kin Man Kevin Tsia, Hong Kong (CN); Yiqing Ray Xu, Auckland (NZ); Jingjiang Jayson Xu, Liuzhou (CN)

(73) Assignee: Versitech Limited, Hong Kong (CN)

( * ) Notice: Subject to any disclaimer, the term of this patent is extended or adjusted under 35 U.S.C. 154(b) by 141 days.

(21) Appl. No.: 14/733,454

(22) Filed: Jun. 8, 2015

(65) Prior Publication Data

US 2016/0294146 A1 Oct. 6, 2016

Related U.S. Application Data

(60) Provisional application No. 62/140,938, filed on Mar. 31, 2015.

(51) Int. Cl.
*H01S 3/00* (2006.01)
*G02B 27/00* (2006.01)
(Continued)

(52) U.S. Cl.
CPC .......... *H01S 3/0057* (2013.01); *G02B 17/006* (2013.01); *G02B 21/0084* (2013.01);
(Continued)

(58) Field of Classification Search
CPC .............. G02B 17/006; G02B 21/0084; G02B 27/1093; G02B 27/4294; G02B 27/09;
(Continued)

(56) References Cited

U.S. PATENT DOCUMENTS 3,612,659 A 10/1971 Forward et al.
3,731,106 A 5/1973 Mansell
(Continued)

FOREIGN PATENT DOCUMENTS

CN 101231383 A 6/2001
CN 101231383 A 7/2008
(Continued)

OTHER PUBLICATIONS

Goda, Keisuke et al., Amplified dispersive Fourier-transform imaging for ultrafast displacement sensing and barcode reading, Applied Physics Letters, Oct. 2, 2008, 93(13): 131109-1 to 131109-3, AIP Publishing, DOI: 10.1063/1.2992064.
(Continued)

*Primary Examiner* — William R Alexander
*Assistant Examiner* — Ephrem Mebrahtu
(74) *Attorney, Agent, or Firm* — Saliwanchik, Lloyd & Eisenschenk

(57) ABSTRACT

Systems and methods for optical pulse stretching or compression in time are provided. An apparatus of the subject invention can operate as an optical dispersive element for optical pulse stretching or compression in time, as well as laser scanning in space. An apparatus can include a spatial disperser arranged to divide a collimated optical pulsed beam into an array of collimated beams with equally spaced angles, a beam shaper configured to control the spreading angle of the beam array, and a cavity to sequentially reflect the individual beams within the beam array. The cavity can include two non-parallel surfaces, such as two non-parallel mirrors.

19 Claims, 15 Drawing Sheets

(51) Int. Cl.
*G02B 27/42* (2006.01)
*G02B 27/10* (2006.01)
*G02B 21/00* (2006.01)
*G02B 17/00* (2006.01)

(52) U.S. Cl.
CPC ..... *G02B 27/1093* (2013.01); *G02B 27/4294* (2013.01); *H01S 3/005* (2013.01)

(58) Field of Classification Search
CPC ........ H01S 3/2308; H01S 3/005; H01S 3/105; H01S 3/10007; H01S 3/10015; H01S 3/10023; H01S 3/10076; H01S 3/0092; H01S 5/14; H01S 5/141; H01S 2301/08
See application file for complete search history.

(56) References Cited

U.S. PATENT DOCUMENTS

| | | | |
|---|---|---|---|
| 4,170,028 A | 10/1979 | DeBenedictis et al. | |
| 4,541,694 A | 9/1985 | Sullivan et al. | |
| 4,902,088 A | 2/1990 | Jain et al. | |
| 4,913,520 A | 4/1990 | Kafka | |
| 5,052,771 A | 10/1991 | Williams et al. | |
| 5,077,621 A | 12/1991 | Kühnle et al. | |
| 5,221,933 A | 6/1993 | Chandler et al. | |
| 5,309,456 A | 5/1994 | Horton | |
| 5,615,013 A | 3/1997 | Rueb et al. | |
| 5,960,016 A | 9/1999 | Perry et al. | |
| 5,995,281 A | 11/1999 | Simon et al. | |
| 6,642,504 B2 | 11/2003 | Cathey, Jr. | |
| 6,739,728 B2 | 5/2004 | Erbert et al. | |
| 6,928,093 B2 | 8/2005 | Webb et al. | |
| 7,035,012 B2 | 4/2006 | Govorkov et al. | |
| 7,321,605 B2 | 1/2008 | Albert | |
| 8,068,522 B2 | 11/2011 | Barty | |
| 8,376,218 B2 | 2/2013 | Jalali et al. | |
| 8,654,441 B2 | 2/2014 | Jalali et al. | |
| 2003/0189756 A1 | 10/2003 | Erbert et al. | |
| 2005/0286599 A1* | 12/2005 | Rafac | G01J 1/4257 372/55 |
| 2006/0193362 A1* | 8/2006 | Kopf | G02B 17/004 372/93 |
| 2006/0244973 A1* | 11/2006 | Yun | A61B 5/0059 356/511 |
| 2009/0021833 A1 | 1/2009 | Jalali et al. | |
| 2009/0103083 A1* | 4/2009 | Kremeyer | G01N 21/1702 356/317 |
| 2009/0273840 A1* | 11/2009 | McLaughlin | G01J 3/02 359/569 |
| 2010/0141829 A1* | 6/2010 | Jalali | A61B 1/00009 348/370 |
| 2011/0206072 A1* | 8/2011 | Karavitis | A61F 9/00825 372/25 |
| 2014/0198365 A1 | 7/2014 | Li et al. | |
| 2014/0206031 A1* | 7/2014 | Yuan | G01N 33/5091 435/29 |
| 2016/0238532 A1* | 8/2016 | Freudiger | G01N 21/6402 |
| 2017/0093111 A1* | 3/2017 | Hooker | H01S 3/0057 |

FOREIGN PATENT DOCUMENTS

| | | |
|---|---|---|
| CN | 102484348 A | 5/2012 |
| EP | 2144095 B1 | 12/2014 |
| FR | 2 802 352 A1 | 6/2001 |

OTHER PUBLICATIONS

Diebold, Eric D. et al., Giant tunable optical dispersion using chromo-modal excitation of a multimode waveguide, Optics Express, Nov. 21, 2011, 19(24):23809-23817, Optical Society of America.

Tan, Zhongwei et al., Real-time wavelength and bandwidth-independent optical integrator based on modal dispersion, Optics Express, Jun. 18, 2012, 20(13):14109-14116, Optical Society of America.

Qiu, Yi et al., Exploiting few mode-fibers for optical time-stretch confocal microscopy in the short near-infrared window, Optics Express, Oct. 22, 2012, 20(22):24115-24123, Optical Society of America.

Reich, Stan, The Use of Electro-Mechanical Mirror Scanning Devices, Laser Scanning Components & Techniques, 1976, 84:47-56, Society of Photo-Optical Instrumentation Engineers (SPIE).

Li, Yajun et al., Laser beam scanning by rotary mirrors. I. Modeling mirror-scanning devices, Applied Optics, Oct. 1, 1995, 34(28):6403-6416, Optical Society of America.

Römer, G.R.B.E. et al., Electro-optic and acousto-optic laser beam scanners—Invited Paper—, Physics Procedia, 2014, 56:29-39, Elsevier B.V.

Herriott, Donald R. et al., Folded Optical Delay Lines, Applied Optics, Aug. 1965, 4(8):883-889, Optical Society of America.

Treacy, Edmond B., Optical Pulse Compression With Diffraction Gratings, IEEE Journal of Quantum Electronics, Sep. 1969, QE-5(9):454-458, IEEE.

Lai, Ming et al., Single-grating laser pulse stretcher and compressor, Applied Optics, Oct. 20, 1993, 33(30):6985-6987, Optical Society of America.

Martinez, Oscar Eduardo, 3000 Times Grating Compressor with Positive Group Velocity Dispersion: Application to Fiber Compensation in 1.3-1.6 μm Region, IEEE Journal of Quantum Electronics, Jan. 1987, QE-23(1):59-64, IEEE.

Tsia, Kevin K. et al., Simultaneous mechanical-scan-free confocal microscopy and laser microsurgery, Optics Letters, Jul. 15, 2009, 34(14):2099-2101, Optical Society of America.

Wang, E. et al., Performance comparison between the high-speed Yokogawa spinning disc confocal system and single-point scanning confocal systems, Journal of Microscopy, May 2005, 218(Pt. 2):149-159, The Royal Microscopical Society.

International Search Report in International Application No. PCT/CN2015/086755, filed Aug. 12, 2015.

* cited by examiner

SPATIAL CHIRPED CAVITY FOR TEMPORALLY STRETCHING/COMPRESSING OPTICAL PULSES

CROSS-REFERENCE TO RELATED APPLICATION

This application claims the benefit of U.S. Provisional Application Ser. No. 62/140,938, filed Mar. 31, 2015, which is herein incorporated by reference in its entirety.

BACKGROUND OF THE INVENTION

Pulse stretching and compression is useful in many applications. One of the most common techniques to achieve efficient pulse stretching/compressing is to use a long dispersive optical fiber within which the light pulse is guided and propagates. A key attribute of using optical fiber to achieve this task is the chromatic dispersion of the optical fiber (typically silica glass), in which different frequency components experience different refractive indices and effectively travel at different speeds along the fiber. It thus separates different frequency components within the pulse in time, i.e. pulse stretching. The dispersive elements can also be used as a compressor of optical pulses in which a temporally spread optical pulse can be recompressed into a pulse that satisfies required applications. For example, this can be done to avoid excessive temporal broadening of ultrashort pulses, which can cause the distortion of signals in telecommunications and in optical microscopy/imaging.

Although optical fibers have been well recognized as one of the most conventional dispersive elements (for pulse stretching/compression), they have limitations which have impeded the utility of optical fibers in a wider range of applications. The allowable operation wavelength range of pulse stretching/compression is restricted by the material (more specifically, the optical loss) of the optical fiber. As the common optical fibers are made of silica glass, the optical loss and thus efficient pulse stretching/compression is optimized to the near infrared spectral windows from 1 $\mu$m to 1.5 $\mu$m. This means that the wavelength of the optical pulses on which optical stretching/compression can be performed strongly depends on the material loss of the optical fiber, ultimately limiting the operational range of wavelengths.

Also, in optical fibers, the pulse stretching/compression cannot be actively or dynamically tunable. The amount of pulse stretching/compression using optical fibers is governed by the dispersion that optical pulses experience. The total dispersion is directly proportional to the fiber length, which is typically fixed once the fiber is fabricated and not flexibly (and widely) adjustable.

In addition, the group delay dispersion (GDD) accumulated by optical pulses in optical fibers is limited, and the amount of temporal stretching also depends on the optical bandwidth of the pulses. The consequence is the need for a long fiber (on the order of 10's of km of standard telecommunication fiber) in order to attain enough GDD for efficient pulse stretching/compression. From the design point of view, using optical fibers for pulse stretching/compression is spatially inefficient.

Moreover, optical nonlinearity that comes with all materials in existing devices is unavoidable and detrimental for pulse stretching/compression. Especially in optical fibers, the optical pulses not only experience linear dispersion (i.e., constant refractive index at each frequency), but also the nonlinear effect in which the refractive indices depend on power distribution of the optical pulse envelope. The optical pulses and therefore the encoded information are eventually distorted during the stretching/compression process.

On the other hand, pulse stretching has been used together with a technique performing time-to-space mapping to achieve optical beam scanning or steering. This approach allows optical beam scanning with the need for mechanical moving parts, such as scanning mirrors, and thus bypasses the fundamental speed limitation (limited by inertia), as well as the motion artifact of such mechanical-based beam scanners. The applications of laser beam scanning have been widely covering from barcode scanning, biomedical imaging, material science research, laser beam machining and ablation, and automated surface inspection in manufacturing industries (including semiconductor integrated circuit (IC) chip manufacturing in the very-large-scale integration (VLSI) industry). In these applications, optical beam scanning is done by spatially deflecting the beam using optical elements. Common choices include galvanometric mirrors and acousto-optic deflectors.

Generally, beam scanning can be classified into active or passive scanning depending on the practical implementations. Active beam scanners require a controllable element to alternate (or steer) the direction of an optical beam. For example, in laser scanning imaging/microscopy (widely adopted in life science or material science applications), a laser beam can be angularly steered by a galvanometer-mirror continuously within a certain range of angles. Combining with a proper relay lens system, such angular beam displacement can be transformed into lateral beam displacement such that a focused beam can be laterally scanned across the sample under test (e.g., biological cells/tissues). The spatial information of the specimen (due to absorption, scattering, or luminescence) is temporally read-out by the scanned beam. Thus, the target image can be retrieved from the serial-time signal using a single pixel photodetector. Ultimately, the scanning rate of these techniques is fundamentally limited by the speed of the mobilized deflecting optics elements and the mechanical movement of these devices. Galvanometric mirrors are widespread in most commercial laser scanning systems; however, because of the mechanical inertia in all galvanometric mirrors, including microelectromechanical system (MEMS) scanners, it only can provide a one-dimensional (1-D) line-scanning rate up to 500 Hz or 1 kHz. Modest improvement in scan speed can be achieved by operating the mirrors at their resonant frequencies (i.e., resonant galvanometric mirrors)—mostly up to about 10 kHz. To overcome the mechanical limitation, both acousto-optic (AO) and electro-optics (EO) modulators have been invented to achieve higher scanning rates on the order of sub-MHz to MHz. However, the high scan speed is achieved with these devices at the expense of a smaller range of the scanning angle and number of resolvable scanned points (i.e., field of view). AO devices also suffer additional optical loss due to the diffraction effect of the device whereas EO devices typically require high voltage (>100 V) to achieve reasonable a scanning range for practical imaging applications.

In contrast to active beam scanning, passive beam scanning is a technique that does not involve direct manipulation beam steering/scanning. A notable example is beam scanning based on a spectral-encoding mechanism. In this technique, the wavelength-tunable light source (called a swept-source) with broadband wavelength spectrum is employed. The output light wavelength is swept in time. Hence, by using an optical element called a spatial disperser (e.g., a prism, diffraction grating, virtually imaged phase array, etc.), the beam can be mapped at different wavelengths to different spatial coordinates (can be in 1-D or 2-D) on the specimen under test. As the wavelength is swept in time, the beam can essentially be scanned across the specimen. The beam steering is thus achieved indirectly by wavelength tuning together with the spectral-encoding concept (i.e., wavelength-to-space mapping). The beam scanning speed of this technique is primarily determined by the wavelength-swept rate of the laser, which is typically limited to 1 kHz or 100 kHz in the current state of the art.

A conventional dispersive medium used in the optical time stretch technique is an optical fiber. For high-resolution beam scanning, a large amount of dispersion (i.e., pulse stretching) is required. This demands for a long length of fiber (>10 km) which inevitably introduces prohibitively high optical loss. The low-loss spectral region of the typical optical (glass) fiber is from about 1 µm to about 1.5 µm, limiting the operation wavelength range and thus the applications of this technique.

BRIEF SUMMARY OF THE INVENTION

Embodiments of the subject invention provide advantageous systems and methods for optical pulse stretching or compression in time, and thus optical beam scanning in space. An apparatus of the subject invention can be operated as an optical dispersive element for optical pulse stretching or compression in time and an optical spatial beam scanner.

In an embodiment, an apparatus for stretching and/or compressing an optical pulse can include: a spatial disperser arranged to divide a collimated optical pulsed beam into an array of beamlets with equally spaced angles; a beam shaper configured to control the spreading angle of the beamlets array; and a cavity to sequentially reflect the individual beams within the beam array. The cavity can be a spatially-chirped cavity and can include, for example, two non-parallel reflective inner surfaces (e.g., mirrors). The individual reflected beamlets, each of which can be encoded with different time information in a sequential manner, can be utilized as the optical spatially-scanned beam without the involvement of any mechanical moving parts.

DETAILED DESCRIPTION OF THE INVENTION

Figure 1:
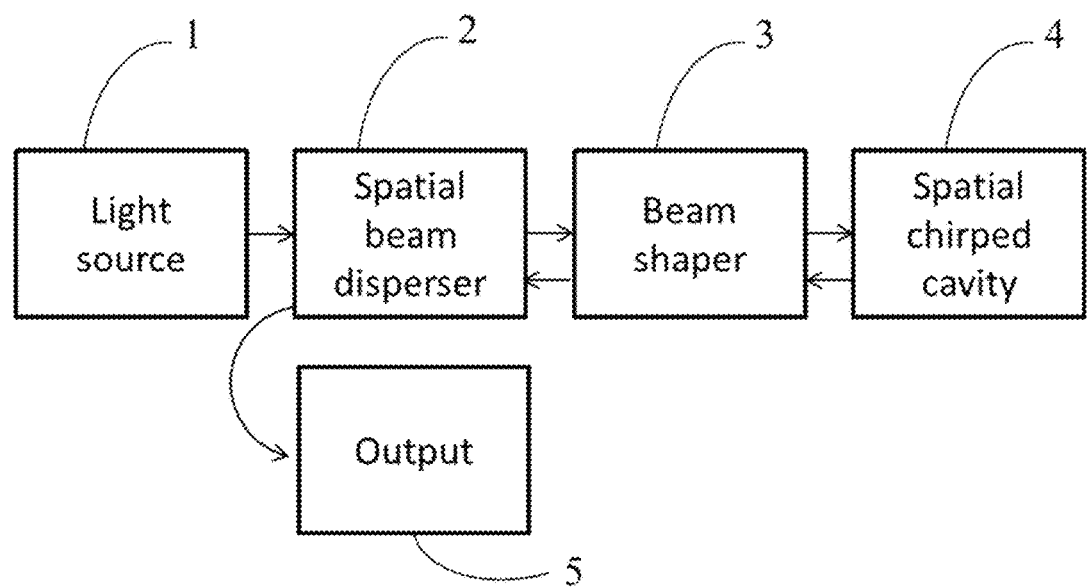
FIG. 1 shows a schematic view of a device of the subject invention.

Embodiments of the subject invention provide advantageous systems and methods for optical pulse stretching or compression in time. An apparatus of the subject invention can operate as an optical dispersive element for optical pulse stretching or compression in time and/or spatial beam scanning as a result of the sequential time-to-space mapping provided by the apparatus.

Optical pulse stretching and compression are useful for a wide range of applications, including optical imaging/spectroscopy in biomedical applications, fiber-optic or free-space optical data transmission in telecommunication, and remote-sensing in industrial and military applications. For example, in order to circumvent the detection bandwidth limitation (especially when a high-speed photodetector is not readily available in the optical wavelength of interest, e.g., mid-infrared range), a series of short optical pulses, each of which carry the bit (1 and 0) information, can be temporally stretched (i.e., the information can be "slowed down") before detection.

In the context of spectroscopy, all of the frequency components in an optical broadband pulse, which is encoded with the spectroscopic information (e.g., from molecules or biological cells/tissues), can be temporally confined and overlapped within an ultrashort time window (e.g., sub-picosecond to sub-nanosecond). Pulse stretching can sequentially separate the frequency components in time and thus can be used to essentially analyze the spectral features without the use of an ordinary spectrometer. This is particularly relevant when no efficient spectrometer is available in the wavelength of interest or when ultrafast spectral analysis is required.

Embodiments of the subject invention can advantageously bypass the use of optical fibers and common diffractive elements to perform temporal pulse stretching and compressing by providing a new concept for realizing highly scalable and flexible tunability of dispersion that can perform pulse stretching and/or compression in an unprecedented wide wavelength spectrum. The wavelength spectrum in which embodiments of the subject invention can perform pulse stretching and/or compression can be, for example, from ultraviolet to infrared (e.g., including all wavelengths in these bands), though embodiments are not limited thereto. The dispersion (e.g., group display dispersion (GDD)) provided by devices and methods of the subject invention can outperform existing technologies. The subject invention can provide scalable delays of different frequency components using an air-filled optical cavity, which can be referred to as a spatially-chirped cavity or a chirped cavity. In many embodiments, the spatially-chirped cavity can include a pair of mirrors, and the mirrors can be non-parallel to each other. In a particular embodiment, the spatially-chirped cavity can consist of a pair of non-parallel mirrors and air.

In many embodiments, scalable delays of different frequency components can be relied upon, using an air-filled (or free-space) optical cavity, which can be referred to as a spatially-chirped cavity or a chirped cavity. The spatially-chirped cavity can include a pair of mirrors, and the mirrors can be non-parallel to each other. This can take advantage of the highly scalable optical delay in the air path. Thus, the dependence on any material dispersion can be completely removed. Embodiments can be extended to any wavelength region without suffering any material losses, for example from ultraviolet to infrared wavelengths, though embodiments are not limited thereto. This unprecedentedly wide range is unattainable with related art pulse stretching/compression technologies.

The subject invention can provide a flexible way to adjust the amount of the GDD by simply adjusting the spacing between the mirrors of the chirped cavity. In addition, the design is capable of choosing either the normal or anomalous dispersion regime dynamically, which is a unique feature absent (or at least nearly absent) in fiber-based pulse stretching/compression techniques. The amount of dispersion that can be provided by embodiments of the subject invention is more than an order of magnitude higher than that of related art free space temporal stretching/compression devices, such as a prism pair or a diffraction grating pair. Also, the range of the tunable GDD is highly scalable (e.g., between femtoseconds and nanoseconds) while the footprint of the apparatus remains compact.

FIG. 1 shows a schematic view of a device of the subject invention. Referring to FIG. 1, a light input 1 can first pass through a spatial disperser 2, and the spatial disperser 2 can disperse the spectral (frequency) components of the beam into space. The input 1 can be, e.g., directly from a light source free-space output or coupled from light guides, such as optical fibers, though embodiments are not limited thereto. The spatial disperser 2 can be any type of diffractive optical component(s), such as diffraction grating or dispersive prisms, or any type of beam diverging element(s), such as a lens, though embodiments are not limited thereto. The spatially-dispersed optical beam can then be optionally reshaped by a beam-shaper 3 (e.g., a beam expander or compressor based on compound lens systems) and can be coupled into an air-filled chirped cavity 4. The cavity 4 can include a pair of non-parallel mirrors and air (i.e., a Fabry-Perot-like cavity). Before entering the chirped cavity, the optical path differences between the frequency components, (i.e., the GDDs) can be negligible. The spectral components can then be reflected back by the cavity 4, and their optical paths can be reversed. All reflected spectral components can be recombined at the spatial disperser 2 and output 5 right after the spatial disperser 2.

Figure 2:
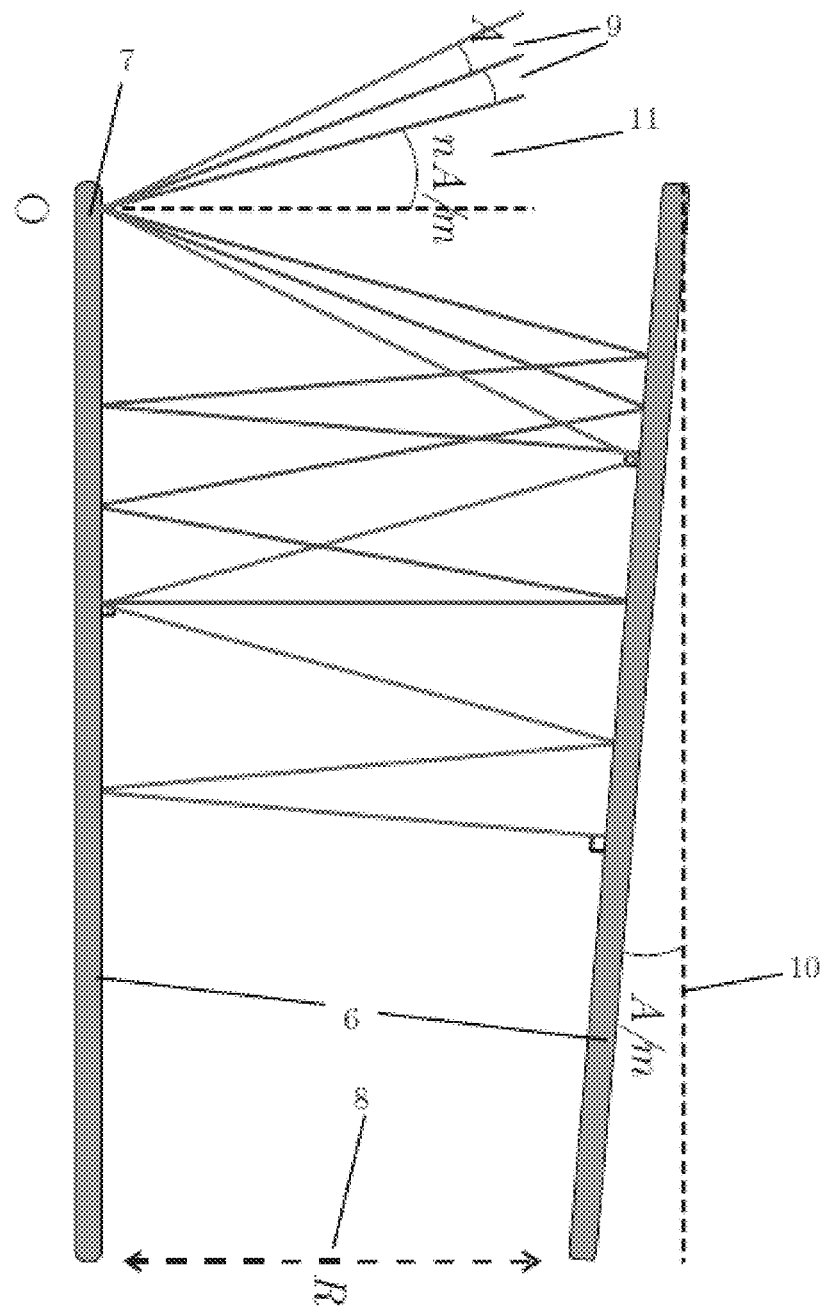
FIG. 2 shows a chirped cavity according to an embodiment of the subject invention.

After passing through the spatial disperser 2 and optionally the beam shaper 3, different frequency components of the optical beam can enter the chirped cavity at different incident angles. They can therefore be confined in the cavity with different "zig-zag" trajectories, which can result in optical path length difference among the frequency components of the light, as seen in FIG. 2. This mechanism alone may not guarantee highly scalable GDD, though. FIG. 2 shows a schematic of a chirped cavity. Referring to FIG. 2, the advantageous feature of the non-parallel mirror configuration 6 of the chirped cavity can lead to a chirped zig-zag trajectory. That is, the zig-zag path can become more closely packed as the light propagates within the cavity. In other words, the incident angle upon each reflection at the two mirrors can be progressively reduced until it reaches zero (i.e., normal incidence). Because of the different input-coupled angles into the cavity, the individual frequency components can propagate for different path lengths until they reach their respective normal-incidence locations in the cavity. Hence, the chirped trajectory can substantially enhance the path length differences. Furthermore, by simply adjusting the separation R 8 of the mirrors of the cavity, the GDD can be dynamically tunable in a large range. In addition, the GDD can be flexibly switched between anomalous and normal dispersion regimes by changing the input beam orientation. This can be done by, e.g., using the beam shaper or simply re-orientating the cavity mechanically. These active GDD tuning features are absent (or at least nearly absent) in all types of optical fibers.

Figure 3:
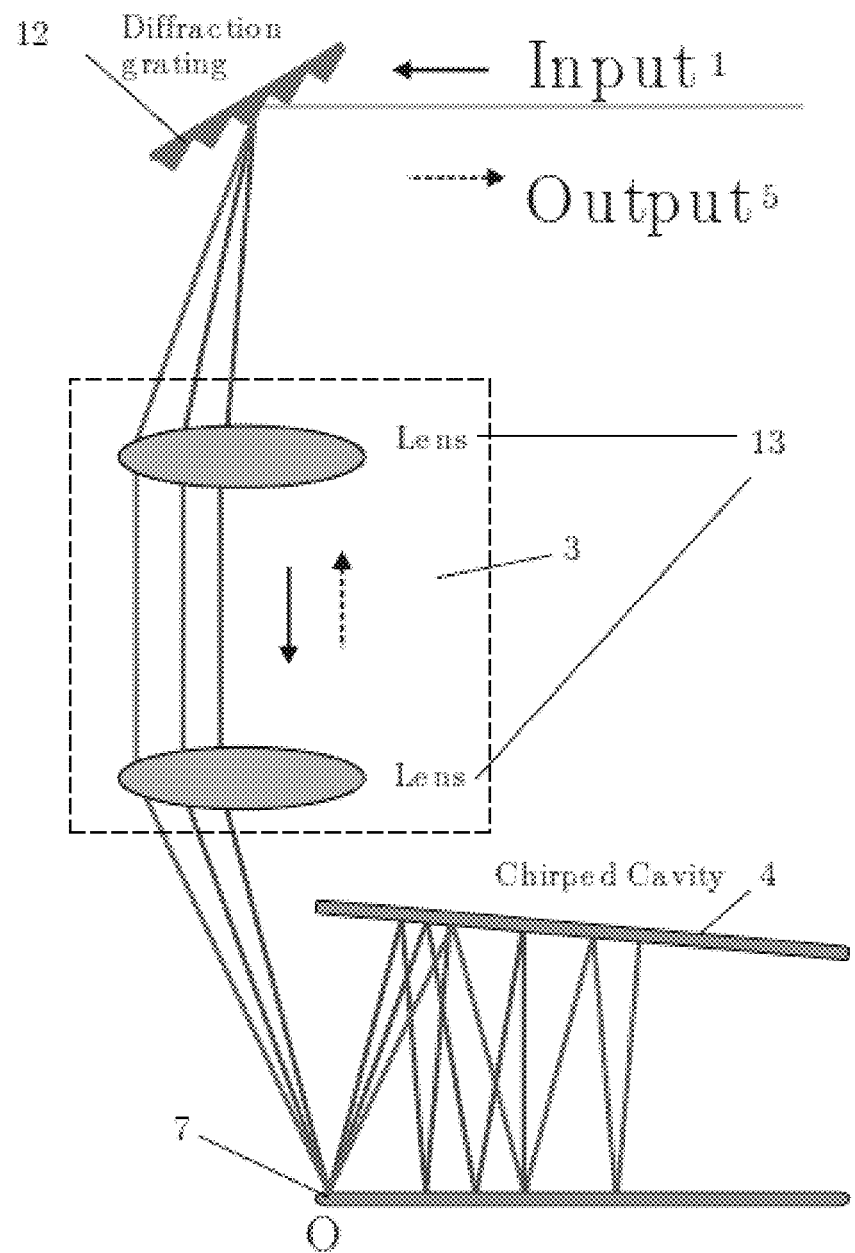
FIG. 3 shows a schematic view of chromatically stretching/compressing of an optical pulse.

FIG. 3 shows a schematic view of chromatically stretching/compressing of an optical pulse. Another unique feature of embodiments of the subject invention is that the zig-zag trajectories can be reversible in such a way that the optical beam not only can restore its original input beam profile, but its GDD can be doubled by the double-pass zig-zag trajectories, as shown in FIGS. 2 and 3. Restoring the input beam profile (i.e., preserving high optical beam quality) is of great importance in terms of its compatibility with many applications. For example, high optical beam quality should be maintained: when the device is used as an ultrafast wavelength-swept source; when the beam has to be coupled into an optical waveguide (such as optical fibers) in order to ensure high coupling efficiency; and when the beam needs to be efficiently relayed to other optical components in a system.

Figure 9:
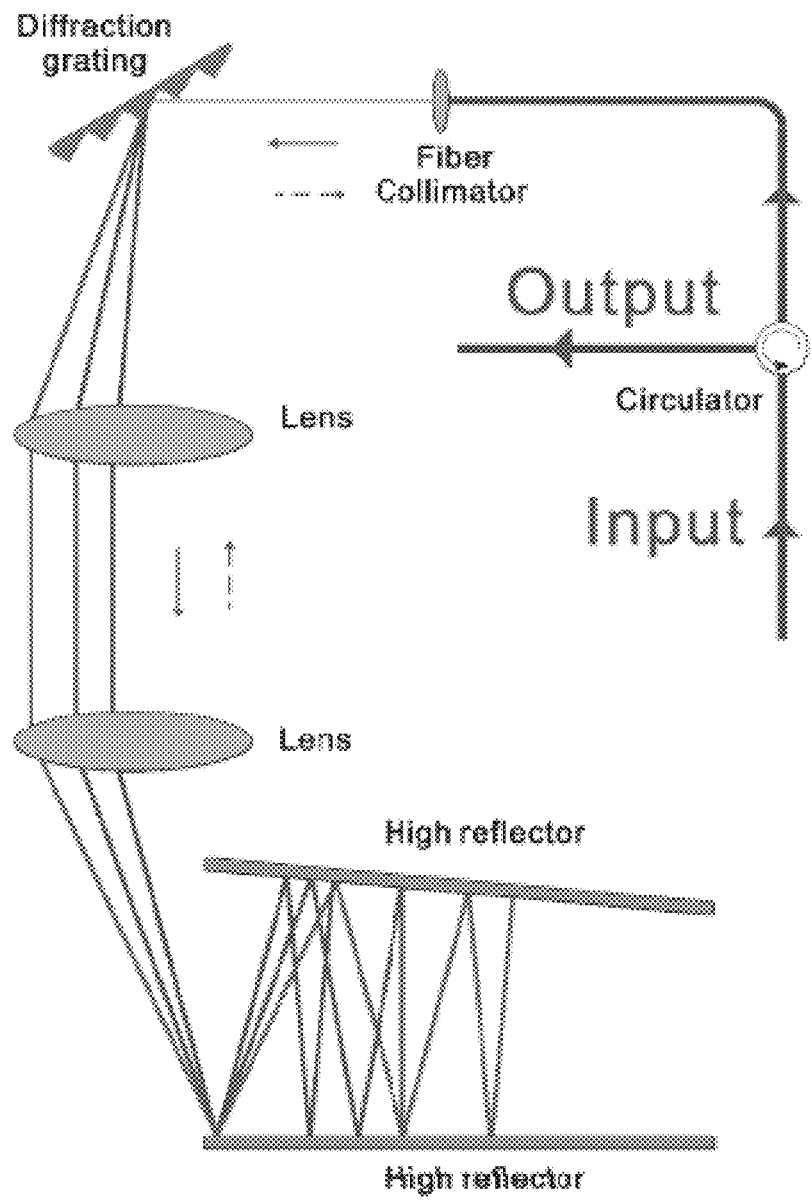
FIG. 9 shows a schematic of a device according to an embodiment of the subject invention based on the use of a first type (Type I) of spatial disperser.

Referring again to FIG. 3, a diffraction grating 12 can be employed as a spatial disperser. The groove density of the grating can be chosen according to the targeted spectral resolution and operation wavelength region. The spatially-dispersed beam can be relayed by a beam shaper 3, which can be a 2-lens 13 telescope system in a four-F correlator configuration such that the diverging beam can be converged before being coupled into the chirped cavity 4. The focal lengths of the two lenses can be either identical or non-identical. The combination of the two lenses can effectively modify the converging angle of the beam array and thus chirped zig-zag trajectories of the frequency components in the cavity. Referring to FIG. 9, in certain embodiments, a circulator together with a fiber collimator can be used before the diffraction grating.

The converging beam array (spatially-dispersed beam) can merge at the back mirror at the cavity input (labeled as pivot point 7) as shown in FIGS. 2 and 3. Each frequency component can then be confined in the cavity with its unique chirped zig-zag path, bouncing back-and-forth between the front and back mirrors. Once the incident angle upon either of the two mirrors reaches zero (i.e., normal incidence), the beam is then back-reflected and reverses the propagation direction along the same optical path. Eventually, the beam, which has been temporally stretched or compressed, restores its original input beam profile. This output beam can be extracted by an optical circulator or optical splitter (both can be the free-space or fiber-based components).

In order to achieve this, two conditions have to be satisfied. First, the front mirror is tilted with an angle A/m 10, where m is an integer, with respect to the back mirror. This tilt angle exactly matches the multiple division of the minimum resolvable angle A 9 of the spatially-dispersed beam array, which is determined by the parameters of the diffraction grating. Based on the straightforward geometric ray tracing, it can be understood that, after each reflection from either the front or back mirror, the incident angle of each frequency component with respect to the next mirror will be reduced by A/m. This reduction is linear and proportional to the tilt angle A/m between the two mirrors, as well as the number of the bounce. Second, the input incident angle of the inner-most frequency component (e.g., the red beam as depicted in FIGS. 2 and 3) has to be an integer multiple of the mirror tilt angle, i.e., nA/m 11, where n is another integer.

In general, the amount of GDD of the optical pulse is determined by four quantities linked to the mirror pairs: the spatial separation of the mirror pair—R 8; the tilt angle of the mirror pair—A/m 10; the incident angle of the frequency comb—nA/m 11; and the incident orientation of the frequency comb (for either normal or anomalous dispersion).

More specifically, the GDD can be expressed as a function of the optical frequency $\omega$:

$$GDD = 2\pi R \frac{\partial^2}{\partial \omega^2} \left\{ \cos(A/m) \sum_{k=1}^{N(\omega)} \frac{\cos(N(\omega)A/m)}{\cos\{[N(\omega)-(k-1)A/m]\}\cos[(N(\omega)-k)A/m]} \right\}, \quad (1)$$

where R 8 is the mirror pair separation, k is the order of each bounce for the individual beam, N($\omega$) is the total number of bounces along the chirped zig-zag path for the individual beam (associated with different frequency $\omega$). It is given by the incident input angle with respect to the chirped cavity and the total angle spread of the input converging beam array. Again, A is the angular separation between the two minimum resolvable frequency components of the spatially-dispersed beam before entering the chirped cavity, and is determined by the grating groove period $\Lambda$ and the focal lengths $f_1$ and $f_2$ of the four-F system, and expressed as $$A \simeq \frac{1}{\Lambda} \cdot \frac{2\pi c}{\omega} \cdot \frac{f_1}{f_2}, \quad (2)$$

where $\omega$ is the center angular frequency of the light and c is the speed of light.

Figure 7A:
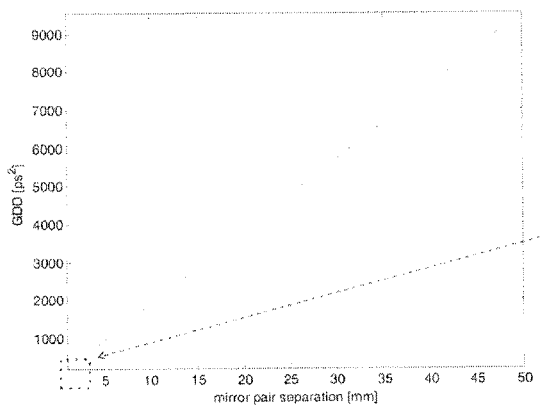
FIG. 7A shows a plot of group delay dispersion as a function of mirror pair separation.
Figure 7B:
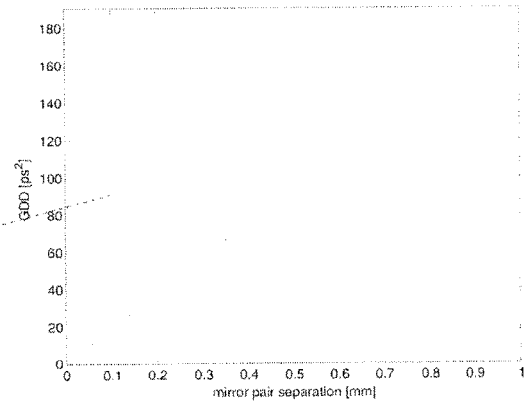
FIG. 7B shows a plot of group delay dispersion as a function of mirror pair separation.

There are a number of parameters (e.g., grating groove density, ray comb incident angle, lens focal lengths) that can be tuned to adjust the amount of GDD in a device of the subject invention. For exemplary purposes only, the highly-scalable GDD tunability offered as a function of the separation of the cavity mirrors R has been demonstrated. FIGS. 7A and 7B show plots of GDD as a function of mirror pair separation. Referring to FIG. 7A, the GDD is directly proportional to the mirror spatial separation R. FIG. 7B is a zoomed-in version of the plot of FIG. 7A in the small GDD region where the amount of the GDD is comparable to the tunability of related art free space pulse stretching/compression devices (e.g. a grating pair or prism pair pulse stretcher/compressor), whereas the large GDD region is unachievable by related art pulse stretching/compression devices. To achieve the large GDD, the dimension of the chirped cavity can be set to, for example, R=5 cm separation with a mirror length of 17 cm, though embodiments are not limited thereto; while for the small GDD, the size of the cavity can be reduced to, for example, R=1 mm and mirrors length of 4 mm, though embodiments are not limited thereto. Comparing to the typical fiber length (commonly on the order of 10-100 km using spools of fiber) that can provide the same large amount of GDD as a device of the subject invention, the device of the subject invention is more far more compact and can even be made in a size to fit within a shoebox.

In many embodiments, pulse stretching can be a result of the input-angle-dependent time-delay difference. Hence, the beamlets of the input light to the cavity do not necessarily have the wavelength-dependent input angles. In other words, enormous pulse-stretching is possible even with narrow-band, long pulse (e.g., picoseconds), without resorting to femtosecond or SC sources that mostly require dedicated control for stable shot-to-shot operation.

A spatial disperser used in embodiments of the subject invention can be of two main types: Type I refers to spectral-encoding components (e.g., a prism or diffraction grating), and Type II refers to angle-encoding components (e.g., a lens or a Fresnel plate). These two types of dispersers disperse the optical beam, or cause the optical beam to diverge, with two different working principles.

A Type I spatial disperser essentially performs spectral-encoding, in which the wavelength components of the light source are mapped into different angular propagation directions (i.e., transforming a beam into an array of spectrally-encoded "beamlets"). As discussed herein, GDD, or in general the path-length differences among different spectral components introduced by the spatial chirped cavity, highly depends on the beamlet angles. Hence, the spatial chirped cavity essentially provides a wavelength-to-time mapping (i.e., optical time-stretch). In many embodiments of the subject invention, the overall spatial arrangement of the beamlets is still preserved after the time-stretch operation, except the neighboring beamlets can have a differential time-delay with respect to each other. The beamlets can then be scanned across the specimen under test by proper relay optics. In the case of using a Type I spatial disperser, a broadband source is required as it involves a spectral-encoding step.

A Type II spatial disperser can also be considered to generate a beamlet array. However, among the beamlets having different propagation angles, each still retains the same entire spectrum as the spatial dispersion for Type II is wavelength independent. The amount of time delay of each beamlet introduced by the spatial chirped cavity depends entirely on the beamlet propagation angle, regardless the wavelength. The reflected beamlets are then temporally and serially separated; this is similar to the optical time-stretch process, except the time-delay is not wavelength-dependent, but angle-dependent. These reflected beamlets can be utilized as a scanning beam, which is scanned across the specimen under test with the use of relay optics after the spatial chirped cavity. In the case of using a Type II spatial disperser, the light source is not limited to broadband, but also narrowband pulse sources. This relaxes the stringent requirements on delicate and/or bulky ultrashort (ultrabroadband) laser source and works well even with a low-cost intensity-modulated continuous wave (CW) laser source with electro-optics components.

Figure 6:
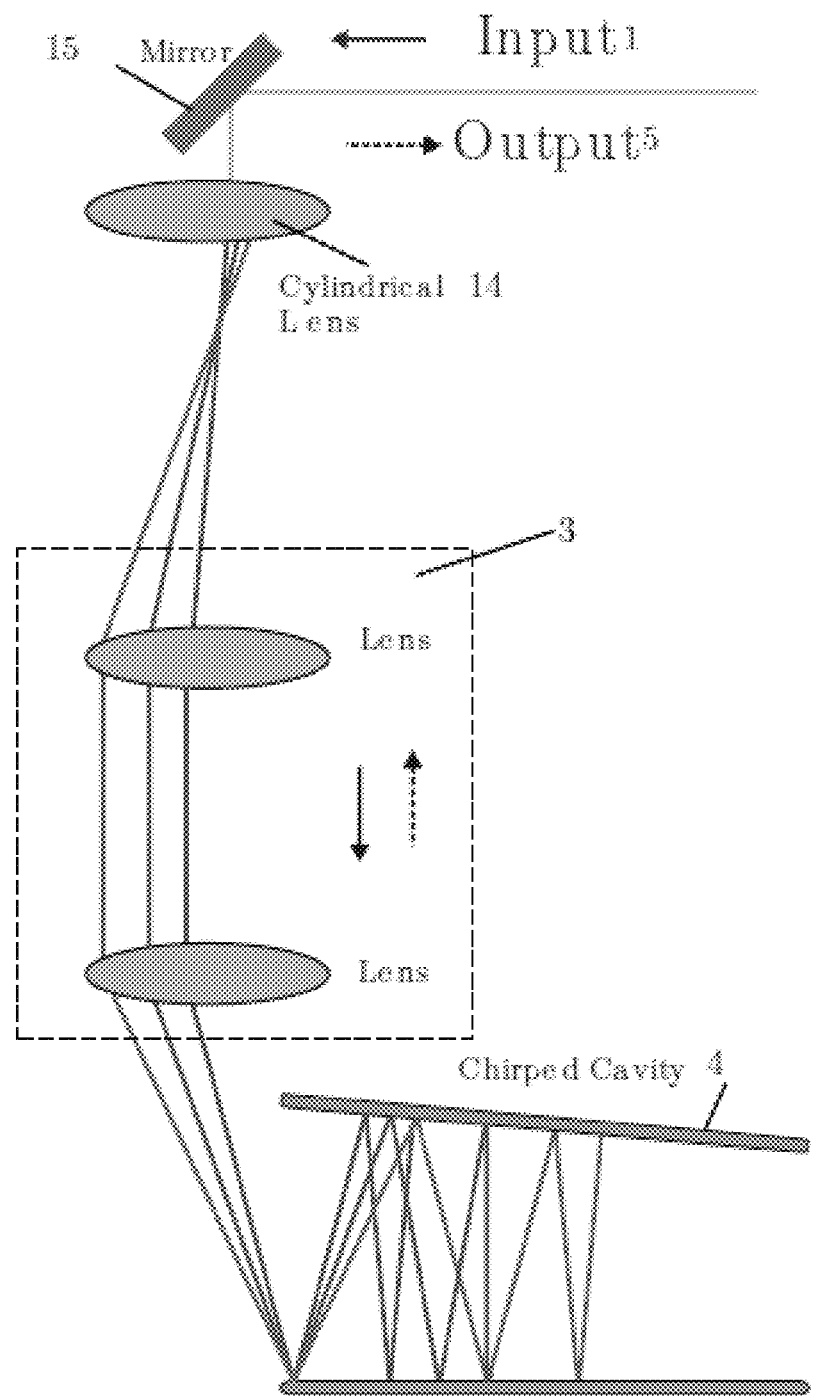
FIG. 6 shows a schematic for pulse stretching based on the use of a second type (Type II) of spatial disperser (e.g., a lens).

FIG. 6 shows a schematic view of a device according to an embodiment of the subject invention based on the use of a Type II spatial disperser. Referring to FIG. 6, similar to the setup shown in FIG. 3, after reflection by the relay mirror 15, the collimated beam can be spatially spread out using a cylindrical lens 14, while in the other transverse dimension the beam can still be collimated. The spatially diverged beam can be regarded as an array of beamlets, each of which propagates at a different angle. Similar to FIG. 3, the generated beamlet array is optionally reshaped by a beam-shaper 3 (e.g., a beam expander or compressor based on compound lens systems) before being coupled into the spatial chirped cavity 4. Individual beamlets of the beam array can enter the spatial chirped cavity at the pivot point 7 with different incident angles. The time delay mechanism can then be explained by FIG. 2. After double-passing (passing into and back out of) the chirped cavity 4, the beamlets with different incident angles can experience different time delays, as in the case of the Type I spatial disperser shown in FIG. 3.

In the case of using a Type I spatial disperser, the incident angles of the beamlets are spectrally-encoded, and the temporal delay between beamlets is essentially the GDD. In contrast, the operation in the case of a Type II spatial disperser bypasses the spectral encoding step. As a result, the amount of time delay of each beamlet introduced by the spatial chirped cavity can depend entirely on the beamlet propagation angle (regardless of the wavelength), which is configured by the spatial disperser (e.g., by changing the beam divergence using a simple lens). A Type I spatial disperser can encode the angles into the individual spectral components, whereas a Type II spatial disperser can directly define the angles of the individual beamlets, each of which contains the entire source spectrum. Each individual beamlet retains the entire frequency spectral content. As a result, the concept of using a Type II spatial disperser for time delay and thus beam scanning (which will be described in more detail below) can achieve higher bandwidth capacity of information encoding and allow a wider operation wavelength range. Also, because it does not require the spectral-encoding step can lead to a simplified passive beam scanning working principle, i.e., directly mapping the time delay to the spatial scanning. This is in contrast to the typical time-stretch approach, in which two steps of mapping are required (spectral-encoding followed by wavelength-time mapping).

Figure 10A:
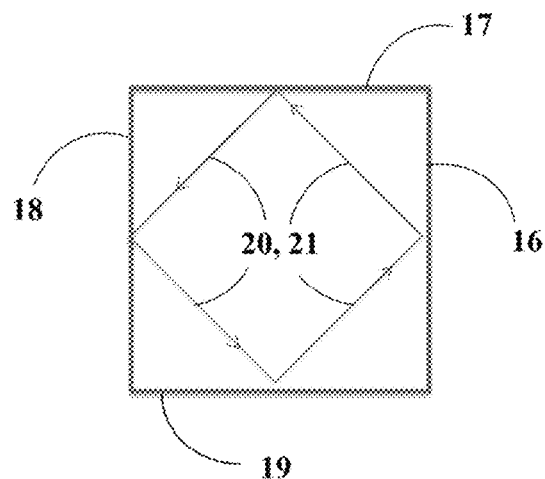
FIG. 10A shows a top-view schematic of a spatial chirped cavity (in a square-shaped cavity, number of sides (N)=4) according to an embodiment of the subject invention.
Figure 10B:
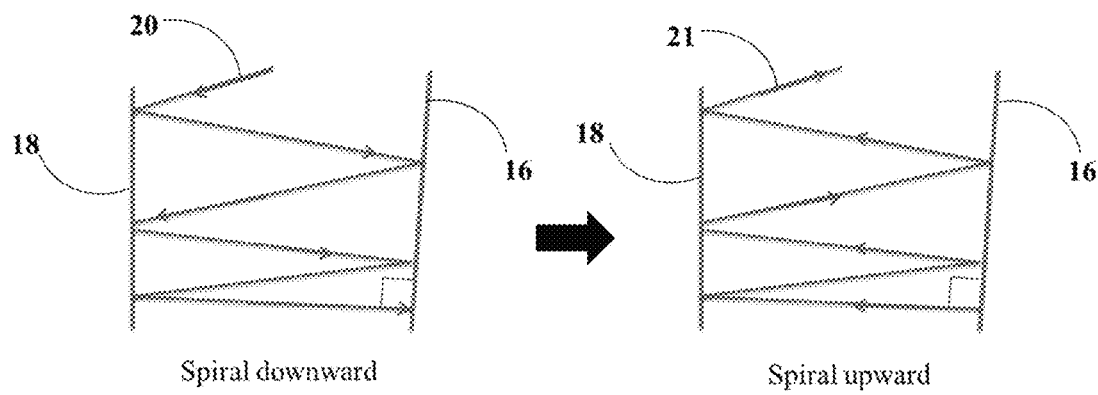
FIG. 10B shows a side-view schematic of a spatial chirped cavity (in a square-shaped cavity, N=4) according to an embodiment of the subject invention, together with double-passed light trajectories.
Figure 10C:
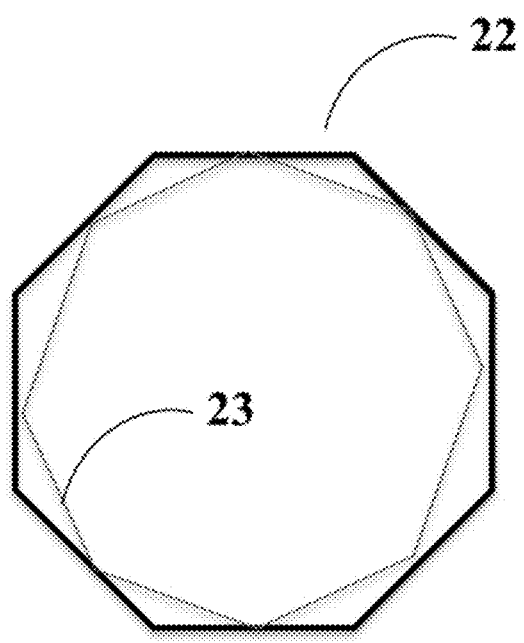
FIG. 10C shows a top-view schematic of a spatial chirped cavity (in an octagonal-shaped cavity, N=8) according to an embodiment of the subject invention.

Though chirped cavities based on two-dimensional (2D) geometric optics have been described, embodiments of the subject invention are not limited thereto. Embodiments can be extended to a three-dimensional (3D) scheme in order to improve the compactness of the chirped cavity. For example, a slowly converged cone-like cavity with a high reflectivity inner surface can be used. FIG. 10 shows schematic views of embodiments of 2-D confinement by a spatial chirped polygonal cavity, with N reflective mirrors. FIG. 10A shows a top view of a square spatial chirped cavity (N=4), in which only one of the mirrors (mirror 16) is angle-tilted. Therefore, as an example, when the input light enters at the mirror 17, the light can follow a chirped spiral-like trajectory 20 downward along the cavity, which is illustrated in FIG. 10B showing the side view of the cavity. After normal incidence upon one of the mirrors (e.g., mirror 16), the light will follow a similar chirped spiral-like trajectory 21 upward along the cavity and exit at mirror 19. Such a cavity can effectively increase the optical path induced. FIG. 10C shows the top view of an octagonal cavity 22 (N=8) with light trajectory 23. Further, the geometry of the high reflector does not necessarily have to be that of a flat mirror. With careful engineering of the geometry of the surface, such as a snail-shape cavity, a nonlinear (e.g., quadratic) chirp in time can be achieved, creating more degrees of freedom to engineer the pulse stretching/compression.

Figure 11:
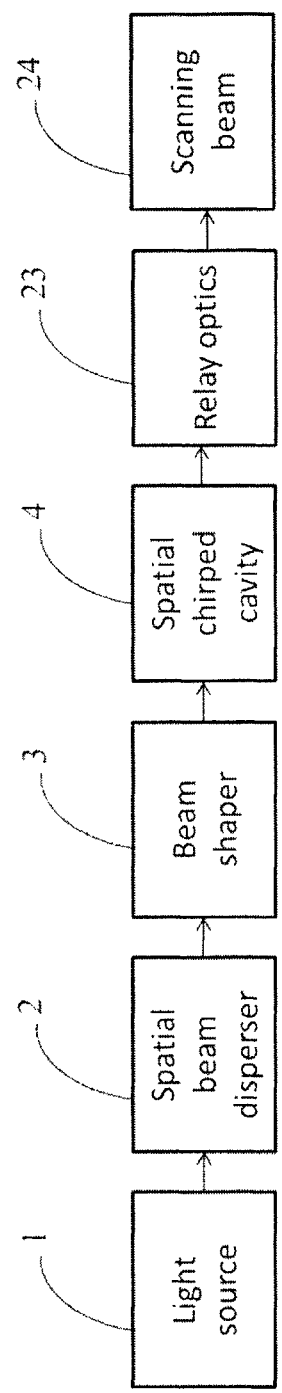
FIG. 11 shows a schematic view of a device of the subject invention for laser beam scanning.

The spatial chirped cavity together with the use of a spatial beam shaper can be applicable for ultrafast all-optical passive laser beam scanning by mapping the individual time-delayed components to different spatial coordinates in a scanning mode. Referring to FIG. 11, once the angle-dependent time-delay is introduced in the double-passed beamlets from the cavity, the angularly-swept beamlets can be transformed into a laterally-scanning beam 24 by a relay optical system 23. Such system can be configured in a way that the pivot point 7 of the cavity is on the Fourier plane of the final beam scanning plane (i.e., the two planes should be in a spatial Fourier transformation relation). In this case, the output beamlets (i.e., after the double-passed trajectory) can be extracted by an optical circulator or optical splitter (both can be the free-space or fiber-based components) and be delivered to the specimen under test. The mirror separation, the tilt angle of the mirror, and the incident angles of the beamlets can all be dynamically tunable parameters. This leads to the ability to actively manipulate the temporal delay and thus the beam scanning rate. Such actively tunable temporal delay introduced by the spatial chirped cavity is also highly scalable.

Figure 12A:
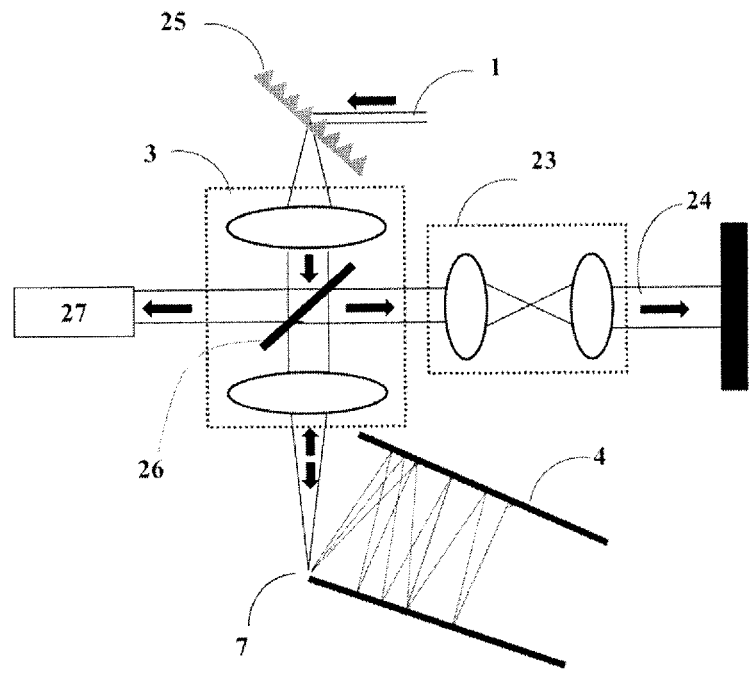
FIG. 12A shows a schematic view of a device of the subject invention for laser beam scanning based on the use of a Type I spatial disperser.
Figure 12B:
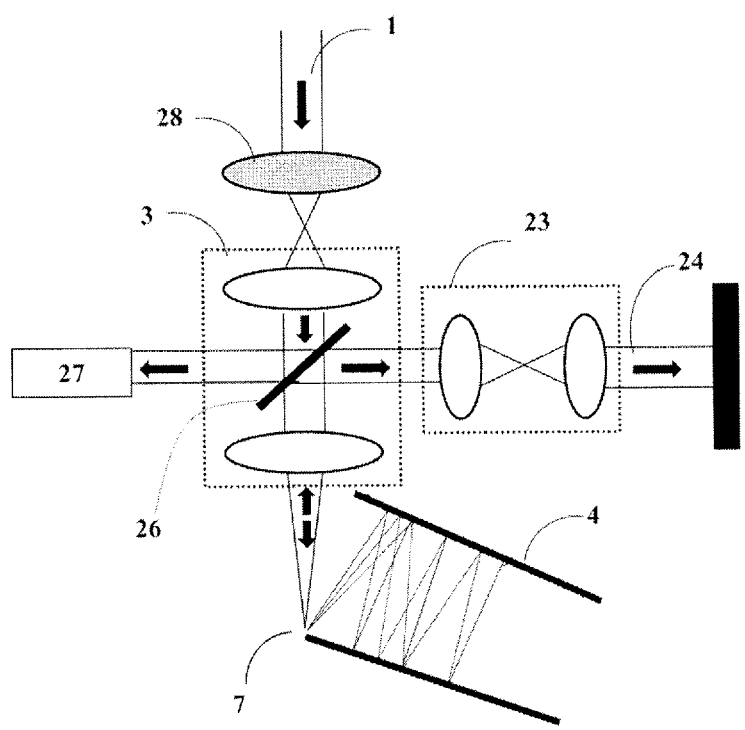
FIG. 12B shows a schematic view of a device of the subject invention for laser beam scanning based on the use of a Type II spatial disperser.

FIG. 12 shows schematic views of apparatuses according to embodiments of the subject invention in the context of laser beam scanning FIG. 12A shows an apparatus based on the use of a Type I spatial disperser 24 (e.g., diffraction grating), and FIG. 12B shows an apparatus based on the use of a Type II spatial disperser 28 (e.g., lens). The double-passed beamlets can be first routed by a beamsplitter 26, followed by a telescopic lens system (e.g., in a 4-f configuration, as shown in FIG. 12). This can ensure that the final scanning beam 24 is scanned across the specimen laterally with a desired scanning field-of-view, which can be controlled by the demagnification of the telescopic system. In the context of imaging, the bright-field/dark-field information of the scanned points can be collected by a photodetector 27 as ordinary practice adopted in an imaging system (FIGS. 12A and 12B).

Figure 12C:
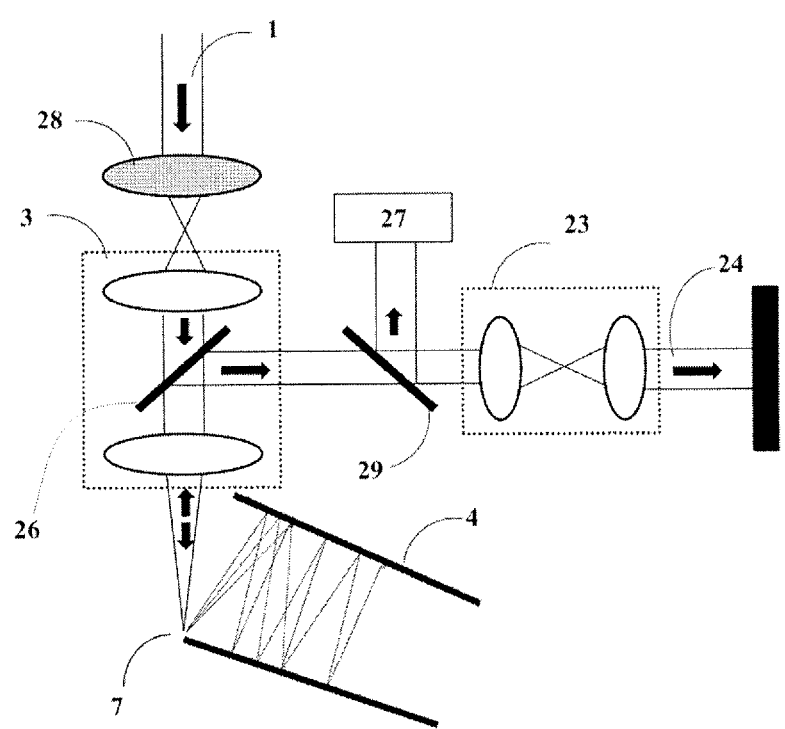
FIG. 12C shows a schematic view of a device of the subject invention for laser scanning fluorescence imaging based on the use of a Type II spatial disperser.

Embodiments of the subject invention are also compatible with fluorescence imaging, which has long been generally inefficient in classical time-stretch or spectrally-encoded imaging. This is because the collected image signals in typical time-stretch or spectrally-encoded imaging have to follow the same spectrally-encoded excitation pathway, making the fluorescence detection inefficient. While additional frequency-modulation and multi-channel detection schemes have been employed for fluorescence spectrally-encoded imaging, embodiments of the subject invention can bypass the spectral-encoding step (by the use of a Type II spatial disperser) and preserve the ultrafast advantages similar to time-stretch, thereby representing a significantly more efficient approach for ultrafast fluorescence image detection. Referring to FIG. 12C, in the case of fluorescence imaging, an additional dichoric mirror 29 is required to spectrally separate the excitation wavelength from the fluorescence emission wavelength (FIG. 12C shows an example with the use of a Type II spatial disperser).

The beam scanning provided by the spatial chirped cavity can be in one dimension (1-D), but complete 2-D imaging can be implemented by two different strategies, depending on the applications: (i) a 2-D raster-scan scheme, in which the fast-axis scanning is done by the cavity while the slow-axis (the orthogonal axis) scanning is accomplished by any type of high-speed beam scanners, such as resonance mirrors (e.g., about 10 kHz) or an acousto-optical deflector (AOD) (e.g., about 100 kHz); (ii) a 1-D line-scan for flow/on-the-fly imaging, in which the high-speed unidirectional motion of the specimen or the light source automatically provides the image scan in one dimension. This is particularly relevant to applications such as imaging flow cytometry, which is advantageous for high-throughput assay tests in clinical diagnostics and fundamental life science research, very-large scale integration (VLSI) semiconductor circuit chip inspection, and massive quality control and inspection in the manufacturing industry, including screening of fabrics/paper.

In an embodiment, an apparatus for stretching and/or compressing an optical pulse can include: a spatial disperser arranged to divide a collimated optical pulsed beam into an array of collimated beams with equally (or approximately equally) spaced angles; a beam shaper configured to control the spreading angle of the beam array; and a cavity to sequentially reflect the individual beams within the beam array. The spatial disperser can be, for example, a spatial diffractive element.

The beam shaper can include a four-F correlator, though embodiments are not limited thereto. Such a four-F correlator can include two or more convex lenses with various focal lengths to control the individual angular spacing between the beams within the beam array.

The cavity can be a spatially-chirped cavity as described herein. The cavity can include two non-parallel inner surfaces (e.g., mirrors). In a particular embodiment, the cavity can include only one entrance opening (e.g., an entrance point). The two inner surfaces of the cavity can each have a high reflection coating. The geometry of the two inner surfaces of the cavity can be flat or curved depending on the requirement of linearity of the optical path length difference/temporal separation. The geometry of the two inner surfaces of the cavity can be three dimensional. The spacing between the two inner surfaces can be air-filled. The range of the operation of the cavity and of the device can be any wavelength. The two inner surfaces can be arranged to have a tilt angle (A/m) matching the angular spacing between the beams of the beam array. The converging beam array can enter the cavity via the entrance port. In certain embodiments, the individual beams of the beam array can experience multiple reflections from the inner surfaces, and the individual beam of the beam array with a multiple integer $N(\omega)$ of the tilt angle (A/m) can be reflected N ($\omega$) times from the inner surface of the cavity, wherein the incident angle of individual beam after each reflection can be reduced by A/m, and eventually become normal to the inner surface of the last reflection, wherein the individual beam with different multiples of tilt angle can experience different numbers of reflection, wherein the individual beams with different multiples of tilt angle can propagate with different optical path length, and wherein the individual beams with different multiples of tilt angle can reverse optical path and recombine at the spatial disperser.

In a case where the two inner surfaces of the cavity each have a high reflection coating, the choice of high reflection coating can be according to the central wavelength and bandwidth of the light source.

The spatial disperser can be an optical diffraction grating, though embodiments are not limited thereto. The spectral components of an optical pulse can be spatially spread into an approximately equal-spaced angular beam array.

The spectral components of an optical pulse can propagate in different optical path lengths induced by the cavity. The spectral components of an optical pulse can be temporally spread due to the different optical path lengths, equivalent to that of the optical pulse experiencing a certain amount of chromatic dispersion.

The spatial disperser can be a cylindrical convex lens, though embodiments are not limited thereto. In certain embodiments, the spatial frequency components can be generated after a collimated pulsed beam passes through the cylindrical convex lens, wherein the spatial frequency components initially converge before the focus of the cylindrical convex lens and spread out after the focus, and wherein the spatial frequency components spread into an equally spaced angular beam array.

The spatial frequency components of an optical pulse can propagate in different optical path lengths induced by the cavity. The spatial frequency components of an optical pulse can be temporally spread due to the different optical path lengths, equivalent to dividing a single pulse into a train of sub-pulses.

In many embodiments, methods of the subject invention can include utilizing one or more of the devices described herein to temporally stretch and/or compress one or more optical pulses.

In many embodiments, methods of the subject invention can include fabricating one or more of the devices described herein using suitable materials.

Devices and methods of the subject invention can provide utility in a wide range of applications. Not only can they be used for flexible dispersion compensation for standard fiber-optic telecommunication as well as for nonlinear optical imaging, but also for visible-light communication, which is an emerging field for indoor navigation and optical Wi-Fi. The related art includes no efficient dispersion compensation technology that can be adopted in the visible spectrum. The subject invention can be particularly advantageous in view of the continuous demand for scaling of data transmission rate. In addition, embodiments of the subject invention provide a new paradigm shift in enabling ultrafast spectroscopy and microscopy, based on the optical time-stretch technique, ranging from, e.g., ultraviolet to infrared wavelengths. Applications include, but are not limited to, high-throughput cellular/tissue assays, breath analysis, toxic gas detection, and air-pollution evaluation through gas spectroscopy.

In the context of laser scanning applications, embodiments of the subject invention can benefit barcode scanning, biomedical imaging, material science research, laser beam machining and ablation, and automated surface inspection in manufacturing industries (including semiconductor integrated circuit (IC) chip manufacturing in the VLSI industry).

Devices and methods of the subject invention can exploit the sequential time delay feature of the spatial chirped cavity for direct serial space-to-time coding. This feature can enable high throughput and ultrafast optical imaging at any wavelength region that cannot be realized by related art fiber-based time stretch techniques. In addition, it enables fluorescence time-stretch imaging, which has not been possible with any related art time-stretch imaging modality due to the lack of viable time-stretch techniques in short wavelengths (namely ultraviolet (UV) to visible, and near-infrared), in which many established fluorescence bio-imaging techniques operate. Also, spectral-encoding is generally ineffective for fluorescence detection (descanning and thus standard confocal detection is generally forbidden). Together with its large stretched-time and low-loss operation, embodiments of the subject invention enable ultrafast fluorescence imaging.

Further, embodiments can simplify time-stretch imaging by relaxing the requirement on broadband pulse source if a Type II spatial disperser is used (i.e., the spectral-encoding can be bypassed). This results in higher efficiency bandwidth encoding and thus allows color imaging to be implemented using multiple wavelength regions pulsed sources (e.g., at the wavelengths of UV, visible, and near infrared) simultaneously. Embodiments also enable mid-infrared (mid-IR) applications, particularly scaling the speed of imaging and spectroscopy (e.g., for remote sensing) because there is no related art high-speed image array available in the mid-IR.

Related art techniques have been developed using optical diffractive elements (e.g. diffraction grating pairs) or spatial dispersion elements (e.g. prism pairs) to achieve group delay dispersion (GDD) in an attempt to bypass the use of optical fibers to perform temporal pulse stretching and compressing. Such techniques suffer from large insertion losses, limited amount of dispersion, or both, explaining why they are only utilized for applications where fine GDD adjustment in a narrow range (only between femtosecond and picosecond) is required. Examples of such techniques include pulse shaping for nonlinear optical microscopy for bio-imaging applications and pulse "pre-chirping" prior to fiber transmission in order to prevent an unwanted nonlinear effect that influences the signal fidelity in fiber-optic communications. Overcoming these challenges, embodiments of the subject invention provide a novel concept for realizing highly scalable and flexible tunability of dispersion (or GDD) that can work in an unprecedented wide wavelength spectrum (e.g., spanning from ultraviolet to infrared). The dispersion that can be provided by the subject invention can outperform current technologies.

A technique has been developed to perform high-speed passive beam scanning based on a two-step approach: (1) pulse stretching (dispersive Fourier transform, or simply called optical time-stretch), i.e., the spectral information is temporally stretched into a serial time signal based on chromatic dispersion, a phenomenon in which different wavelength (frequency) components of a broadband light propagate at different velocities due to the difference of the refractive index of the medium; and (2) spectral encoding, i.e., different wavelengths (frequencies) of the spectrum of the broadband light source are spatially and sequentially dispersed at different spatial coordinates by using a one-dimensional or two-dimensional spatial disperser. The passive beam scanning rate using this technique is significantly faster than the spectral-encoded beam scanning discussed in the background above because it is entirely governed by the repetition rate of the pulse laser—typically on the order of MHz or even GHz.

Embodiments of the subject invention offer high-speed laser beam scanning at a scanning rate as high as MHz or even GHz, governed only by the repetition rate of the laser source. This is orders of magnitude faster than any related art active or passive beam scanning technologies. The beam scanning performance of the subject invention is not subject to mechanical instability and fatigue, allowing long-term robust operations.

In many embodiments of the subject invention, the beam deflection angle range is determined only by the relay optical components, not by the chirped cavity itself. Therefore, it can be flexibly tunable and achieve a wide deflection angle, overcoming the trade-off between scanning rate and deflection angle in related art scanning technologies (e.g., galvanometric mirrors, AOD, and EOD). In addition, the resolvable scan points can be adjusted in a wide range from 10's to 100's by engineering the geometry of the spatial chirped cavity. This is independent of the scanning rate (which can be governed by the repetition rate of the laser source), overcoming the trade-off between scanning rate and resolvable scan points in related art scanning technologies (e.g., AOD and EOD).

Embodiments of the subject invention address several issues that related art passive scanning techniques exhibit (e.g., the time-stretch imaging modality based on the dispersive Fourier transform). The subject invention not only can work with broadband ultrashort pulsed laser sources (typically delicate, bulky, and costly), it is also compatible with the intensity-modulated CW laser sources (in the case of a Type II spatial disperser), significantly expanding the choices of light sources for this ultrafast beam scanning technique. This further implies that multiple light sources can be wavelength-multiplexed to perform color imaging, which is absent in related art time-stretch or spectral-encoded imaging modalities. Also, compared to the large GDD operation in optical time-stretch enabled by optical fibers, the subject invention can introduce very large GDD, without suffering optical loss due to material scattering and absorption, because of the operation can be carried out completely in free space. Thus, it does not limit to any specific working wavelength windows that commonly exist in optical fibers, enabling all optical passive beam scanning from UV to IR range. It is thus a versatile technique that can be applicable to optical bioimaging, barcode scanning, remote sensing, biomedical imaging, material science research, laser beam machining and ablation, and automated surface inspection in manufacturing industries (including semiconductor IC chip manufacturing in the VLSI industry). Moreover, the subject invention allows dynamic tuning of the time-delay separation between the individual beamlets, due at least in part to the free-space design of the cavity. The time-delay separation can be made sufficiently large such that that it is comparable to or longer than the fluorescence lifetimes of typical fluorescent molecules/probes widely employed in biology and biochemistry research, thereby making the apparatus configured to perform laser-scanning fluorescence imaging at an unprecedented imaging rate. This is a significant feature as time-stretch imaging has long been regarded to be incompatible with fluorescence imaging.

All patents, patent applications, provisional applications, and publications referred to or cited herein (including those in the "References" section) are incorporated by reference in their entirety, including all figures and tables, to the extent they are not inconsistent with the explicit teachings of this specification.

Exemplified Embodiments

The invention includes, but is not limited to, the following embodiments.

Embodiment 1. An apparatus for stretching/compressing an optical pulse, comprising:

a spatial disperser arranged to divide a collimated optical pulsed beam into an array of collimated beams with equally spaced angles;

a beam shaper configured to control the spreading angle of the beam array; and a cavity to sequentially reflect the individual beams within the beam array.

Embodiment 2. The apparatus according to embodiment 1, wherein the spatial disperser is a spatial diffractive element.

Embodiment 3. The apparatus according to any of embodiments 1-2, wherein the beam shaper includes a four-F correlator.

Embodiment 4. The apparatus according to embodiment 3, wherein the four-F correlator includes two or more convex lenses with various focal lengths to control the individual angular spacing between the beams within the beam array.

Embodiment 5. The apparatus according to any of embodiments 1-4, wherein the cavity is a spatially-chirped cavity.

Embodiment 6. The apparatus according to any of embodiments 1-5, wherein the cavity includes two non-parallel inner surfaces.

Embodiment 7. The apparatus according to any of embodiments 1-6, wherein the cavity includes only one entrance port.

Embodiment 8. The apparatus according to any of embodiments 6-7, wherein the two inner surfaces of the cavity each have a high reflection coating.

Embodiment 9. The apparatus according to any of embodiments 6-8, wherein the geometry of the two inner surfaces of the cavity depends on the requirement of linearity of the optical path length difference/temporal separation.

Embodiment 10. The apparatus according to any of embodiments 6-9, wherein the geometry of the two inner surfaces of the cavity is flat.

Embodiment 11. The apparatus according to any of embodiments 6-9, wherein the geometry of the two inner surfaces of the cavity is curved.

Embodiment 12. The apparatus according to any of embodiments 6-11, wherein the geometry of the two inner surfaces of the cavity is three dimensional.

Embodiment 13. The apparatus according to any of embodiments 6-12, wherein the spacing between the two inner surfaces is air-filled.

Embodiment 14. The apparatus according to any of embodiments 1-13, wherein a range of operation of the apparatus is any wavelength.

Embodiment 15. The apparatus according to any of embodiments 1-13, wherein a range of operation of the apparatus is from ultraviolet to infrared wavelengths.

Embodiment 16. The apparatus according to any of embodiments 6-15, wherein the two inner surfaces are arranged to have a tilt angle (A/m) matching the angular spacing between the beams of the beam array.

Embodiment 17. The apparatus according to any of embodiments 1-16, wherein the converging beam array enters the cavity via an entrance port of the cavity.

Embodiment 18. The apparatus according to any of embodiments 6-17, wherein the individual beam of the beam array experiences multiple reflections from the inner surfaces, wherein the individual beams of the beam array with a multiple integer $N(\omega)$ of the tilt angle (A/m) is reflected $N(\omega)$ times from the inner surface of the cavity, wherein the incident angle of the individual beams after each reflection can be reduced by A/m, and eventually become normal to the inner surface of the last reflection, wherein the individual beams with different multiples of tilt angle experiences different numbers of reflection, wherein the individual beams with different multiples of tilt angle can propagate with different optical path length, and wherein the individual beams with different multiples of tilt angle can reverse optical path and recombine at the spatial disperser.

Embodiment 19. The apparatus according to any of embodiments 8-18, wherein the high reflection coating is chosen according to the central wavelength and bandwidth of the light source.

Embodiment 20. The apparatus according to any of embodiments 1-19, wherein the spatial disperser is an optical diffraction grating.

Embodiment 21. The apparatus according embodiment 20, wherein the spectral components of an optical pulse are spatially spread into an approximately equal-spaced angular beam array.

Embodiment 22. The apparatus according to any of embodiments 18-21, wherein the spectral components of an optical pulse propagate in different optical path lengths induced by the cavity.

Embodiment 23. The apparatus according to any of embodiments 18-21, wherein the spectral components of an optical pulse are temporally spread due to the different optical path lengths, equivalent to that of the optical pulse experiencing a certain amount of chromatic dispersion.

Embodiment 24. The apparatus according to any of embodiments 1-23, wherein the spatial disperser is a cylindrical convex lens.

Embodiment 25. The apparatus according to embodiment 24, wherein the spatial frequency components are generated after a collimated pulsed beam passes through the cylindrical convex lens, wherein the spatial frequency components initially converge before the focus of the cylindrical convex lens and spread out after the focus, and wherein the spatial frequency components spread into an equally spaced angular beam array.

Embodiment 26. The apparatus according to any of embodiments 18-25, wherein the spatial frequency components of an optical pulse propagate in different optical path lengths induced by the cavity.

Embodiment 27. The apparatus according to any of embodiments 18-25, wherein the spatial frequency components of an optical pulse are temporally spread due to the different optical path lengths, equivalent to dividing a single pulse into a train of sub-pulses.

Embodiment 28. The apparatus according to any of embodiments 1-27, which is capable of high-speed laser beam scanning at a scanning rate on the order of MHz, wherein the scanning rate is governed only by the repetition rate of a laser source.

Embodiment 29. The apparatus according to any of embodiments 1-27, which is capable of high-speed laser beam scanning at a scanning rate on the order of GHz, wherein the scanning rate is governed only by the repetition rate of a laser source.

Embodiment 30. The apparatus according to any of embodiments 1-29, wherein the apparatus is configured to allow for dynamic tuning of time-delay separation between the individual beams.

Embodiment 31. The apparatus according to embodiment 30, wherein the time-delay separation between the individual beams is sufficiently large such that the device is configured to perform laser-scanning fluorescence imaging.

Embodiment 32. The apparatus according to any of embodiments 1-27 and 30-31, further comprising a laser source for laser beam scanning,
wherein the apparatus is configured to perform high-speed laser beam scanning at a scanning rate on the order of megahertz (MHz) or gigahertz (GHz), and
wherein the scanning rate is governed only by a repetition rate of the laser source.

Embodiment 33. The apparatus according to any of embodiments 1-32, wherein a beam deflection angle range of the apparatus is not affected the cavity, such that the beam deflection angle range is flexibly tunable.

Embodiment 34. The apparatus according to any of embodiments 1-33, wherein a quantity of resolvable scan points of the cavity is determined by the geometry of the cavity.

Embodiment 35. The apparatus according to any of embodiments 28, 29, and 32, wherein the laser source is a broadband ultrashort pulsed laser source or an intensity modulated CW laser source.

Embodiment 36. The apparatus according to any of embodiments 1-35, comprising a plurality of light sources to provide optical pulses, wherein the apparatus is configured to wavelength-multiplex the multiple light sources to perform color imaging.

Embodiment 37. The apparatus according to any of embodiments 1-36, wherein the apparatus is configured to perform optical passive beam scanning from ultraviolet wavelengths to infrared wavelengths.

Following are examples that illustrate procedures for practicing the invention. These examples should not be construed as limiting.

EXAMPLE 1

Figure 4:
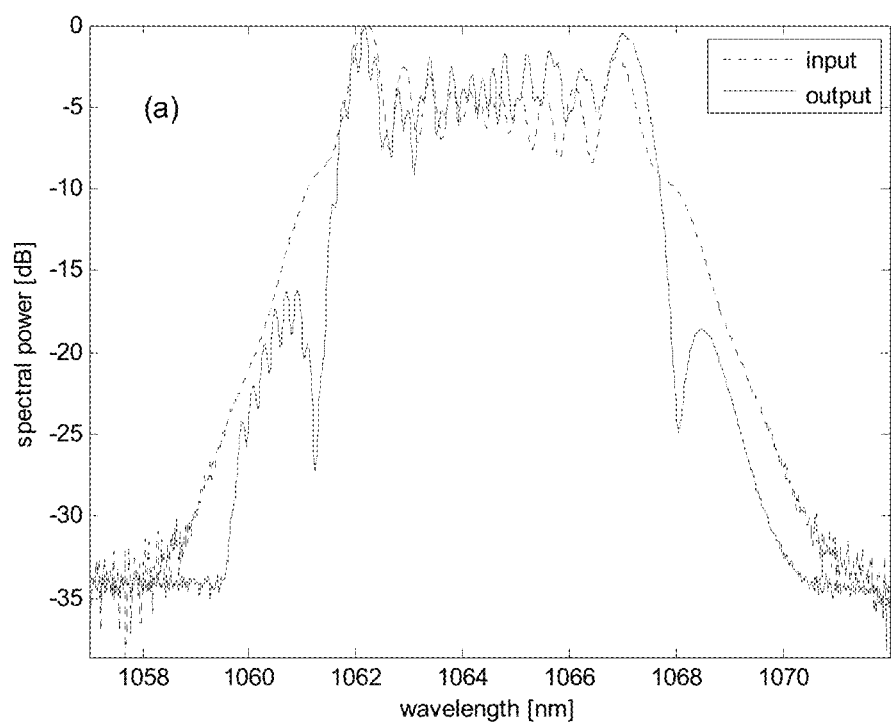
FIG. 4 shows a plot of input and output spectra of an optical pulse.

An optical pulse from a commercial mode-locked laser with a 20 MHz repetition rate was time-stretched using two approaches: (1) using a long normal-dispersion optical fiber (5 km), and (2) using a chirped cavity (based on a Type I spatial disperser) according to an embodiment of the subject invention, with dimensions of 4 cm×7 cm (mirror separation×mirror length). The optical pulse from the laser was initially spectral-broadened to a transform-limited optical pulse by a nonlinear effect called self-phase modulation, as shown in the dashed curve in FIG. 4. Using the device of the subject invention, the output spectrum (solid curve) captured by a conventional spectrometer shows that almost the entire input spectrum can be retained with minimal spectral distortion.

Figure 5A:
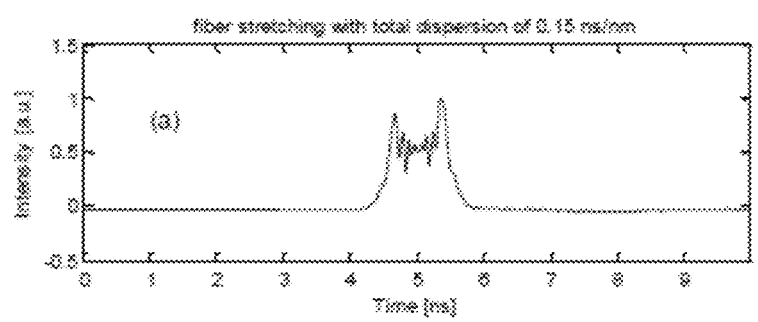
FIG. 5A shows a plot of a temporally stretched optical signal stretched by an optical dispersive fiber.
Figure 5B:
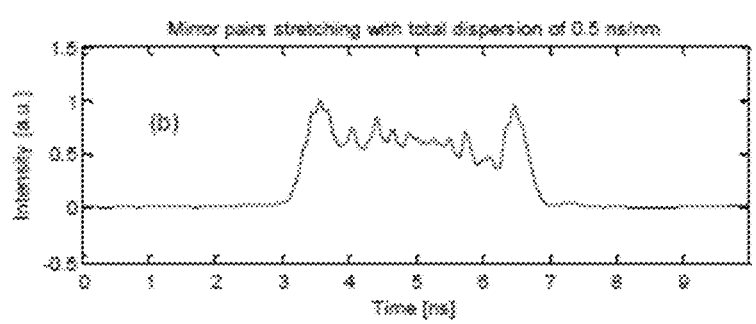
FIG. 5B shows a plot of a temporally stretched optical signal stretched by an embodiment of the subject invention.

To further examine the total GDD induced by the device of the subject invention, the output signal was captured by an 80 Gb/s real time oscilloscope to observe the temporal broadening of the optical pulse. FIG. 5A shows a plot of a temporally stretched optical signal stretched by the optical dispersive fiber, and FIG. 5B shows a plot of a temporally stretched optical signal stretched by the device of the subject invention. Referring to FIG. 5A, the 5 km long normal dispersion optical fiber can achieve a total group velocity dispersion of 0.15 ns/nm, resulting in mapping the spectrum of the pulse into time via pulse stretching. The pulse stretching is a result of chromatic (material) dispersion of the glass fiber. In contrast, the device of the subject invention does not rely on chromatic dispersion for pulse stretching. Instead, the chirped cavity maps the spectral information to the time domain via the free space optical path differences governed by the geometric design. Referring to FIG. 5B, the total group velocity dispersion of the device of the subject invention is as high as 0.5 ns/nm, with a total loss of 18 dB, which is mainly due to the limitation of mirror length.

EXAMPLE 2

Figure 8A:
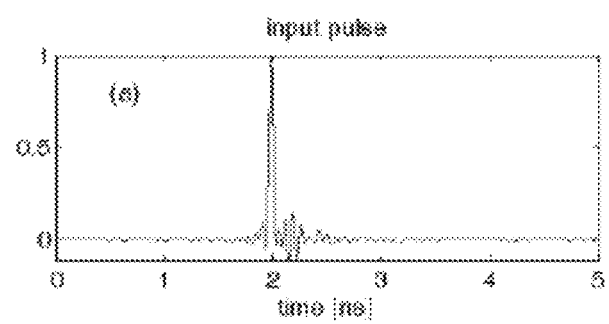
FIG. 8A shows a single input optical pulse.
Figure 8B:
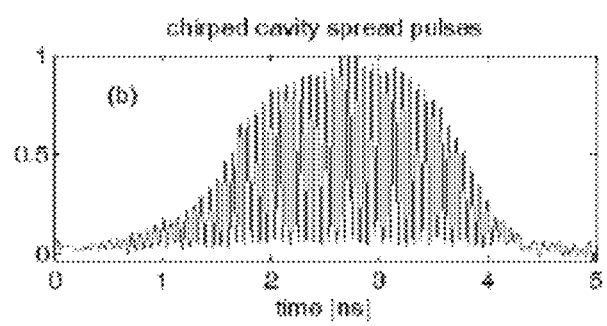
FIG. 8B shows a pulse train generated by an embodiment of the subject invention.

The setup shown in FIG. 6 is also based on the use of a Type II spatial disperser. FIG. 8A shows a single input pulse that was launched to the setup, which stretched it into a long envelope of pulse train. FIG. 8B shows the pulse train. Referring to FIGS. 8A and 8B, the single pulse was spread into an envelope of pulse train with a width of 2.5 ns, and the number of effective pixels was more than 60. Given that there were sufficient pixels that can be used to encode spatial information into the pulse train, this pulse train can further be used to perform another modality of time-stretch imaging (in bright-field imaging mode), which no longer relies on spectral encoding and thus chromatic dispersion.

EXAMPLE 3

Figure 13B:
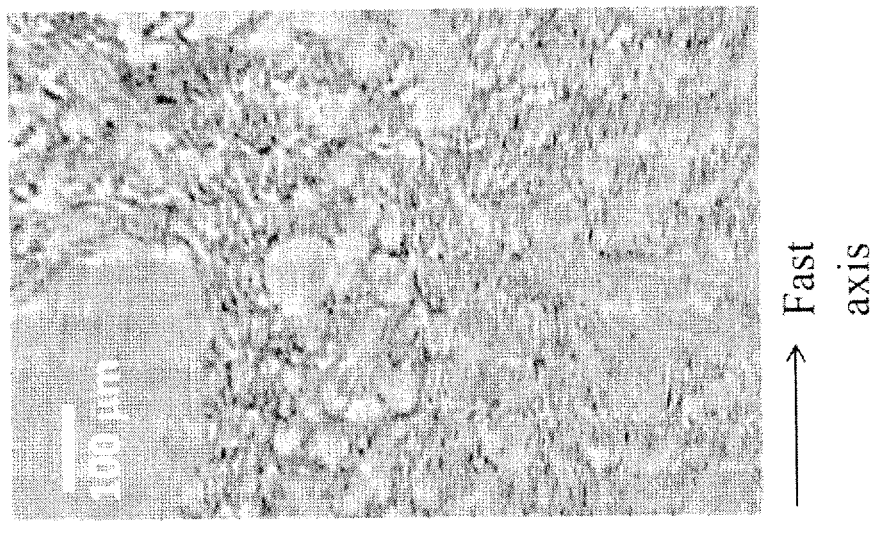
FIG. 13B shows a bright-field laser scanning image of a lung tissue section captured by a device of the subject invention based on the use of a Type II spatial disperser.
Figure 13A:
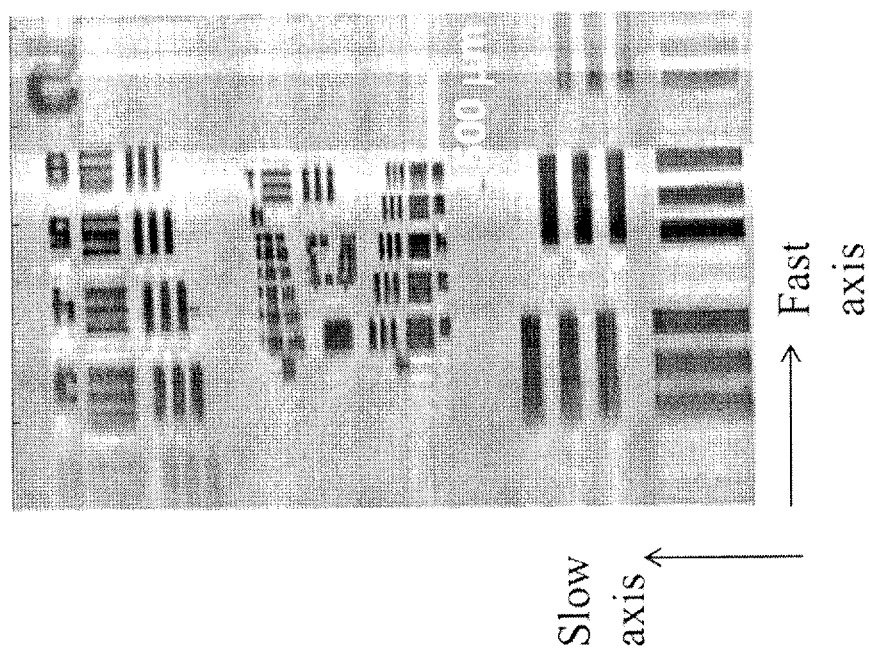
FIG. 13A shows a bright-field laser scanning image of a resolution target captured by a device of the subject invention based on the use of a Type II spatial disperser.

The setup shown in FIG. 12B, which is a laser-scanning setup based on the spatial chirped cavity and a Type II spatial disperser, was used to capture bright-field images. FIG. 13 shows representative bright-field images (FIG. 13A: resolution target; FIG. 13B: a lung tissue section) captured by this setup. The center wavelength of the illumination is about 710 nm. The single-shot repetition rate (i.e., scan-scan) was 80 MHz. The cavity provided the fast-axis 1-D scanning while the slow-axis scanning was accomplished by translating the resolution target along the orthogonal axis. The ultrafast line-scan was accomplished by direct time-to-space mapping, in contrast to the two-step mapping adopted in related art time-stretch imaging modalities.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

U.S. Pat. No. 4,913,520 (Optical fiber for pulse compression).
U.S. Pat. No. 8,068,522 (Hyper dispersion pulse compressor for chirped pulse amplification systems).
European Patent No. 2144095 (Optical fiber pulse stretcher and module).
K. Goda, K. K. Tsia, and B. Jalali, "Amplified dispersive Fourier-transform imaging for ultrafast displacement sensing and barcode reading," Appl. Phys. Lett. 93, 131109 (2008).
E. D. Diebold, N. K. Hon, Z. W. Tan, J. Chou, T. Sienicki, C. Wang, and B. Jalali, "Giant tunable optical dispersion using chromo-modal excitation of a multimode waveguide," Optics Express 19, 23809-23817 (2011).
Z. W. Tan, C. Wang, E. D. Diebold, N. K. Hon, and B. Jalali, "Real-time wave-length and bandwidth-independent optical integrator based on modal dispersion," Optics Express 20, 14109-14116 (2012).

Y. Qiu, J. Xu, K. K. Y. Wong, and K. K. Tsia, "Exploiting few mode-fibers for optical time-stretch confocal microscopy in the short near-infrared window," Opt. Express 20, 24115-24123 (2012).

S. Reich, "The use of electro-mechanical mirror scanning devices," in (International Society for Optics and Photonics, 1976), 47-56.

M. Gottlieb, C. L. M. Ireland, and J. M. Ley, "Electro-optic and Acousto-optic Scanning and Deflection," New York, Marcel Dekker, Inc., 1983, 208 p. 1(1983).

Y. Li and J. Katz, "Laser beam scanning by rotary mirrors. I. Modeling mirror-scanning devices," Appl. Opt. 34, 6403-6416 (1995).

G. F. Marshall and G. E. Stutz, Handbook of optical and laser scanning (CRC Press, 2011). J. I. Montagu, "Galvanometric and resonant low inertia scanners," Opto-Mechanical Devices, Systems, and Data Storage Optics, G F Marshall, ed, 193-288 (1985).

G. R. B. E. Römera, P. Bechtold, "Electro-optic and Acousto-optic Laser Beam Scanners," Physics Procedia Volume 56, 29-39 (2014).

U.S. Pat. No. 7,321,605 (Helical optical pulse stretcher).
U.S. Pat. No. 7,035,012 (Optical pulse duration extender).
U.S. Pat. No. 5,309,456 (Pulse stretcher).
U.S. Pat. No. 5,960,016 (Aberration-free, all-reflective laser pulse stretcher).
U.S. Pat. No. 6,928,093 (Long delay and high TIS pulse stretcher).
U.S. Pat. No. 6,739,728 (Short pulse laser stretcher-compressor using a single common reflective grating).
U.S. Pat. No. 5,077,621 (Optical pulse compressor).
United States Patent Application Publication No. 2009/0021833 A1 (Chromomodal dispersion apparatus and methods).

D. R. Herriott, and H. J. Schulte, "Folded Optical Delay Lines," Applied Optics 4, 883-889 (1965).

E. Treacy, "Optical pulse compression with diffraction gratings," Quantum Electronics, IEEE Journal of 5, 454-458 (1969).

M. Lai, S. T. Lai, and C. Swinger, "Single-Grating Laser-Pulse Stretcher and Compressor," Applied Optics 33, 6985-6987 (1994).

O. E. Martinez, "3000 Times Grating Compressor with Positive Group-Velocity Dispersion —Application to Fiber Compensation in 1.3-1.6 μm Region," IEEE Journal of Quantum Electronics 23, 59-64 (1987).

U.S. Pat. No. 3,731,106 (Beam scanner for high power laser)
U.S. Pat. No. 4,170,028 (Facet tracking in laser scanning)
U.S. Pat. No. 4,541,694 (Acousto-optic scanner)
U.S. Pat. No. 4,902,088 A (Integrated optic device for laser beam scanning)
U.S. Pat. No. 5,052,771 A (Integrated electro-optical scanner)
U.S. Pat. No. 5,221,933 (Beam scanning Galvanometer with low inertia mirror and magnet)
U.S. Pat. No. 5,615,013 (Galvanometer and camera system)
U.S. Pat. No. 3,612,659 (Passive beam-deflecting apparatus)
U.S. Pat. No. 6,642,504 B2 (High speed confocal microscope)
U.S. Pat. No. 8,376,218 (Apparatus and method for dispersive Fourier-transform imaging)
U.S. Pat. No. 8,654,441 B2 (Differential interference contrast serial time encoded amplified microscopy)
United States Patent Application Publication No. 2014/0198365A1 (Multi-beam laser scanning system and method)

K. K. Tsia, K. Goda, D. Capewell, and B. Jalali, "Simultaneous mechanical-scan-free confocal microscopy and laser microsurgery," Optics letters 34, 2099-2101 (2009).

E. Wang, C. M. Babbey, and K. W. Dunn, "Performance comparison between the high-speed Yokogawa spinning disc confocal system and single-point scanning confocal systems," Journal of microscopy 218, 148-159 (2005).

We claim:

1. An apparatus for stretching and compressing an optical pulse, comprising:
    a spatial disperser arranged to divide a collimated optical pulsed beam into a beamlet array of beamlets with equally spaced angles;
    a beam shaper configured to control a spreading angle of the beamlet array; and
    a cavity configured to reflect the individual beamlets within the beamlet array in a sequential and spatially-chirped manner,
    wherein the individual beamlets enter into the cavity with different incident angles, merge at a same pivot point of the cavity, and reflect from the same pivot point of the cavity.

2. The apparatus according to claim 1, wherein the spatial disperser is a spectrally-encoded spatial disperser comprising a diffraction grating,
    wherein spectrally-encoded spatial frequency components are generated after the collimated optical pulsed beam passes through the diffraction grating, and
    wherein the spectrally-encoded spatial frequency components spread angularly into the beamlet array in space.

3. The apparatus according to claim 1, wherein the beam shaper controls space and a temporal profile of the beam, and comprises a four-F correlator,
    wherein the space profile of the beam is determined by an individual angular spacing between the beamlets within the beamlet array, and
    wherein the temporal profile of the beam is determined by a time delay of each beamlet, which is in turn determined in part by the angular spacing between the beamlets within the beamlet array.

4. The apparatus according to claim 1, wherein the cavity is a spatially-chirped cavity including two non-parallel reflective inner surfaces,
    wherein the inner surfaces are curved surfaces, and
    wherein a geometry of each inner surface is two-dimensional or three-dimensional.

5. The apparatus according to claim 4, wherein a spacing between the two inner surfaces is air-filled, thereby allowing dynamic tuning of time-delay separation between the individual beamlets.

6. The apparatus according to claim 5, wherein the time-delay separation between the individual beamlets is sufficiently large such that the device is configured to perform laser-scanning fluorescence imaging, and
    wherein the time-delay separation between the individual beamlets is the same as or longer than a fluorescence lifetime.

7. The apparatus according to claim 1, wherein a range of operation of the apparatus is from ultraviolet to infrared wavelengths.

8. The apparatus according to claim 4, wherein the two inner surfaces are arranged to have a tilt angle (A/m) matching the angular spacing between the beams of the beamlet array for generation and enhancement of pulse stretching, and also for compression.

9. The apparatus according to claim 8, wherein the individual beamlet of the beamlet array experiences multiple reflections from the inner surfaces, wherein the individual beamlets of the beamlet array with a multiple integer $N(\omega)$ of the tilt angle (A/m) is reflected N ($\omega$) times from the inner surface of the cavity, wherein the incident angle of the individual beamlets after each reflection can be reduced by A/m, and eventually become normal to the inner surface of the last reflection, wherein the individual beamlets with different multiples of tilt angle experiences different numbers of reflection, wherein the individual beamlets with different multiples of tilt angle can propagate with different optical path length, and wherein the individual beamlets with different multiples of tilt angle can reverse optical path and recombine at the spatial disperser.

10. The apparatus according to claim 9, wherein spectrally-encoded spatial frequency components of an optical pulse propagate in different optical path lengths reconfigured and enhanced by the cavity.

11. The apparatus according to claim 9, wherein spectrally-encoded spatial frequency components of an optical pulse are temporally spread due to the different optical path lengths, equivalent to that of the optical pulse experiencing a certain amount of chromatic dispersion.

12. The apparatus according to claim 1, wherein the spatial disperser is a spectrally-encoded-free spatial disperser comprising a cylindrical convex lens, wherein spatial frequency components are generated after the collimated optical pulsed beam passes through the cylindrical convex lens, wherein the spatial frequency components initially converge before the focus of the cylindrical convex lens and spread out after the focus, and wherein the spatial frequency components after the focus spread angularly into a beamlet array in space.

13. The apparatus according to claim 12, wherein the spatial frequency components of an optical pulse propagate in different optical path lengths reconfigured and enhanced by the cavity.

14. The apparatus according to claim 12, wherein the spatial frequency components of an optical pulse are temporally spread due to the different optical path lengths, regardless of wavelengths, and equivalent to dividing a single pulse into a train of sub-pulses, and wherein the train of sub-pulses is generated as a result of each beamlet propagating for a different optical path length and a different time delay within the cavity.

15. The apparatus according to claim 6, further comprising a laser source for laser beam scanning, wherein the apparatus is configured to perform high-speed laser beam scanning at a scanning rate on the order of megahertz (MHz) or gigahertz (GHz), wherein the scanning rate is governed only by a repetition rate of the laser source, and wherein the laser beam scanning has a beam deflection angle range.

16. The apparatus according to claim 15, wherein the laser source is a broadband ultrashort pulsed laser source or an intensity modulated CW laser source.

17. The apparatus according to claim 15, wherein the beam deflection angle range is flexibly tunable and is independent of a geometry of the cavity, and wherein the geometry of the cavity comprises a mirror separation, a length, and a tilt angle.

18. The apparatus according to claim 1, wherein a quantity of resolvable scan points of the cavity is determined by a geometry of the cavity, and wherein the geometry of the cavity comprises a mirror separation, a length, and a tilt angle.

19. The apparatus according to claim 1, comprising a plurality of light sources to provide optical pulses, wherein the apparatus is configured to wavelength-multiplex the multiple light sources to perform multi-wavelength imaging, and wherein the multi-wavelength imaging allows image contrast comprising at least one of bright-field, dark-field, and fluorescence.

* * * * *